(12) United States Patent
Ji et al.

(10) Patent No.: US 6,970,987 B1
(45) Date of Patent: Nov. 29, 2005

(54) METHOD FOR STORING DATA IN A GEOGRAPHICALLY-DIVERSE DATA-STORING SYSTEM PROVIDING CROSS-SITE REDUNDANCY

(75) Inventors: Minwen Ji, Sunnyvale, CA (US); Shun-Tak Leung, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 10/352,842

(22) Filed: Jan. 27, 2003

(51) Int. Cl.⁷ .......................................... G06F 12/06
(52) U.S. Cl. ........................... 711/162; 711/170; 714/6
(58) Field of Search ..................... 711/162, 165, 112, 711/170; 707/203, 204; 714/6, 1, 42; 709/217

(56) References Cited

U.S. PATENT DOCUMENTS

| | | | | |
|---|---|---|---|---|
| 5,321,703 | A * | 6/1994 | Weng | 714/797 |
| 5,675,802 | A * | 10/1997 | Allen et al. | 717/103 |
| 5,729,733 | A * | 3/1998 | Sharif-Askary | 707/8 |
| 6,334,168 | B1 * | 12/2001 | Islam et al. | 711/113 |
| 6,336,173 | B1 * | 1/2002 | Day et al. | 711/161 |
| 6,502,205 | B1 * | 12/2002 | Yanai et al. | 714/7 |
| 2002/0010542 | A1 * | 1/2002 | Ahrens et al. | 701/200 |
| 2002/0099727 | A1 * | 7/2002 | Kadyk et al. | 707/201 |
| 2003/0105912 | A1 * | 6/2003 | Noren | 711/1 |

OTHER PUBLICATIONS

H. Ambach et al., "BD2 and System 390 a Perfect Fit", 10 pps., undated.□□IEEE publication, "Overview of Disaster Recovery for Transaction Processing System" by Richard King et al., IBM T.J. Watson Research Center, Yorktown Heights, pp. 286-293 Jun. 1990.*

IEEE publication, "Design Approaches for Real-Time Transaction Processing Remote Site Recovery" by D. I. Burkes, IBM Almaden Research Institute, pp. 568-572 Mar. 1990.*

Mendel Rosenblum and John K. Ousterhout, "The Design and Implementation of a Log-Structured File System," ACM Transactions on Computer Systems, vol. 10, No. 1, Feb. 1992, pp. 26-52.*

"VERITAS NetBackup and Storage Migrator" www.sun.com/stora .../netbackup.html; $sessionid$QEOQTDQAA-C2QHAMTA1FU5Y, published at least as early as Oct. 28, 2000, 5 pages.*

Uniting File Systems; Experimental Large Scale, Distributed File Systems Are now Being Created (included related article on the History of the AFS Project), Unix Review, vol. 7, No. 3, Mar. 1989, pp. 61-70.*

Using Multiple Replica Classes to Improve Performance in Distributed System, by Peter Triantafillou and David Tayloer, The 11th International Conference on Distributed Computing Systems, May 20-24, 1991, pp. 420-428.*

(Continued)

*Primary Examiner*—Pierre-Michel Bataille

(57) ABSTRACT

A method of redundantly storing data in a geographically-diverse data-storing system is presented. The data-storing system has one or more data sites and a set of data-protecting sites. A new version of a set of data is written to a first data site, and a representation of the new version is generated. The representation is transmitted from the first data site to a subset of the data-protecting sites. At each data-protecting site, the representation is stored and an acknowledgment of the storing is transmitted back. Also, upon receipt back of a commit command, a data-protecting operation is performed on the representation to generate a data-protecting value, which is also stored. Then, storage corresponding to the representation is released. Further, at a first data site, once acknowledgments from each data-protecting site are received, a commit command is transmitted to the subset of data-protecting sites. Additionally, storage is released corresponding to a previous version of the set of data.

25 Claims, 7 Drawing Sheets

OTHER PUBLICATIONS

Federighi C, "A distributed Hierarchical Storage Manager for a Video-on-Demand System," Department of Electrical Engr. and Computer Science, University of California, Berkeley, California, Dec. 1993.*

T. Anderson, M. Dahlin, J. Neefe, D. Patterson, D. Roselli, and R. Wang. Serverless network file systems. 1995 ACM 0-89791-715-4/95/0012; In Proceedings of the 15th ACM Symposium on Operating System Principles, pp. 109-126, Copper Mountain Resort, Colorado, Dec. 1995.

C. Chao, R. English, D. Jacobson, A. Stepanov, and J. Wilkes, Mime: A high performance parallel storage device with strong recovery guarantees. Technical Report HPL-CSP-92-9 rev. 1, Hewlett-Packard Laboratories, Palo Alto, CA, Nov. 1992.

W. de Jonge, M.F. Kasshoek, and W.C. Hsieh. The logical disk: A new approach to improving file systems. 1993 ACM 0-89791-632-8/93/0012; In Proceedings of the 14th ACM Symposium on Operating System Principles, pp. 15-28, Asheville, NC, Dec. 1993.

R.M. English and A.A. Stepanov. Loge: A self-organizing disk controller. In Proceedings of USENIX 1992 Winter Technical Conference, pp. 237-251, San Francisco, CA, Jan. 1992.

J.H. Hartman and J.K. Ousterhout. The Zebra striped network file system. ACM Transactions on Computer Systems, 13(3):274-310, Aug. 1995.

D.D.E. Long, B.R. Montague, and L.F. Cabrera. Swift/RAID: a distributed RAID system. Technical Report UCSC-CRL-94-06, University of California, Santa Cruz, 1994.

S. Savage and J. Wilkes, AFRAID—a frequently redundant array of independent disks. In Proceedings of the 1996 USENIX Technical Conference, pp. 27-39, San Diego, CA, Jan. 1996.

M. Stonebraker and G.A. Schloss. Distributed RAID—a new multiple copy algorithm. CH2840-7/0000/0430, In Proceedings of the Sixth IEEE International Conference on Data Engineering, pp. 430-437, Feb. 1990.

R. Wang and T.E. Anderson. xFS: A wide area mass storage file system. 0-8186-4000-6/93, IEEE, In Proceedings of the Fourth Workshop on Workstation Operating Systems, pp. 71-78, Napa, CA, 1993.

J. Wilkes, R. Golding, C. Staelin, and T. Sullivan. The HP AutoRAID hierarchical storage system. ACM Transactions on Computer Systems, 14(1):108-136, Feb. 1996.

* cited by examiner

METHOD FOR STORING DATA IN A GEOGRAPHICALLY-DIVERSE DATA-STORING SYSTEM PROVIDING CROSS-SITE REDUNDANCY

BACKGROUND OF THE INVENTION

The present invention relates to redundant data storage, and in particular, to a method for redundantly storing data in a geographically-diverse data-storing system that provides cross-site redundancy, utilizes erasure codes, and isolates update and recovery processes of data blocks from those of others, to ensure recoverability of data.

Redundant data storage is utilized in RAID systems to provide data protection in storage devices and in storage-area networks. There are many different schemes for allocating and storing redundant data, corresponding to different levels of RAID. For example, for RAID-5, parity information is distributed among different parity blocks in each of the independent data disks. The data and parity information is arranged on the disk array so that the two types of data are always on different disks. This scheme provides fault tolerance, and is generally the most popular form of RAID used today. Other RAID systems use different "erasure codes" (i.e., error-correcting codes where the position of the error is known) to implement redundancy schemes.

Another type of system that may utilize redundant data storage is a geographically-diverse network, such as a geoplex. A geoplex is a collection of geographically-distributed sites consisting of servers, applications, and data. The geoplex sites cooperate to improve reliability and/or availability of applications and data through the use of redundancy. Data redundancy in geoplexes typically takes the form of mirroring, where one or more full copies of the logical data are maintained at remote sites.

Mirroring has a number of desirable properties. It is conceptually simple, and it does not compromise overall system performance when operating in an asynchronous mode for remote updates. Also, the recovery procedure for mirroring is simple, and can utilize all sites to process some of the work (i.e., an active—active configuration), or can implement fast failover from the primary site to a secondary site (i.e., an active-passive configuration).

However, mirroring also has many drawbacks. In particular, mirroring is expensive. Because the amount of storage required for the logical data must be doubled or more, depending on the number of mirror copies, the total cost of mirroring can be substantial. In addition, for very high reliability, more than one mirror copy generally is required. While the high cost for remote mirroring may be acceptable to some entities with mission-critical applications, such as online transaction processing systems, a geoplex would not qualify as a low-cost product available for many other applications with large data sets, such as data mining and scientific computing. Additionally, mirroring does not provide much flexibility for system design and operation.

Despite these well-known and inherent drawbacks of mirroring, alternative methods have not generally been implemented in geoplexes. Thus, it would be desirable to provide a geographically-diverse data-storing system that utilizes erasure codes to reduce expense and provide greater flexibility, without sacrificing data-recovery capability.

SUMMARY OF THE INVENTION

In one embodiment, the present invention is a method of storing data in a geographically-diverse data-storing system. The data-storing system has one or more data sites and a set of data-protecting sites. The method includes writing a new version of a set of data to a first data site of the one or more data sites, and generating a representation of the new version. The representation is then transmitted from the first data site to a subset of the data-protecting sites. At each data-protecting site of the subset, the representation is stored and an acknowledgment of the storing is transmitted back to the data site. Upon receipt back of a commit command, a data-protecting operation is performed on the representation to generate a data-protecting value, which is stored. Finally, storage corresponding to the representation is released.

Also, at a first data site, once acknowledgments are received from each of the data-protecting sites of the subset, a commit command is transmitted to the subset of data-protecting sites. Additionally, storage is released corresponding to a previous version of the set of data.

In another embodiment, the invention is also a method of storing data in a geographically-diverse data storing system. The data-storing system has one or more data sites and a set of data-protecting sites. The method includes mapping physical addresses of the one or more data sites to a set of logical addresses in a logical-to-physical map, in order to logically associate a set of data blocks that include geographically-diverse data blocks. Also, at a local portion of the data-storing system, the method includes writing a new version of a set of data to a first physical address of a first data site of the one or more data sites. Previously, a previous version of the set of data was written to a second physical address of the first data site.

Next, the new version of the set of data is logged in a redo log, and a representation of the second version is transmitted to a subset of the set of data-protecting sites. When the subset of the one or more data-protecting sites acknowledge receipt of the representation, the new version is removed from the redo log. Also, at that time, the logical-to-physical map is modified such that a logical data block corresponding to the set of data identifies the new version, and additionally, storage is released corresponding to the new version. Further, at that time, a command is transmitted to the subset of the data-protecting sites to generate and store a data-protecting value based at least in part on the representation.

In yet another embodiment, the present invention is a method of recovering data in a geographically-diverse data-storing system. The data-storing system has one or more data sites and a set of data-protecting sites, and a set of data blocks is lost from a first data site of the one or more data sites. The method includes, for each lost data block of the set of lost data blocks, requesting, from a subset of the set of data-protecting sites, one or more available version numbers corresponding to the lost data block. The method also includes requesting, from a subset of the one or more data sites, a set of version numbers of stable data blocks that comprise, along with the lost data block and one or more data-protecting blocks, a redundancy group. Then, based at least in part on the one or more available version numbers, a latest recoverable version of the lost data block is determined.

Next, one or more data-protecting values corresponding to the latest recoverable version are received from the subset of the data-protecting sites. Also, one or more stable data blocks, associated with the same redundancy group as the lost block, are received from the subset of the data sites. Finally, the lost data block is regenerated from the one or more data-protecting values and the one or more stable data blocks by performing a data-regenerating operation.

BRIEF DESCRIPTION OF THE DRAWINGS

Additional objects and the features of the invention will be more readily apparent from the following detailed description and appended claims when taken in conjunction with the drawings, in which:

DETAILED DESCRIPTION OF THE PREFERRED EMBODIMENTS

Figure 1:
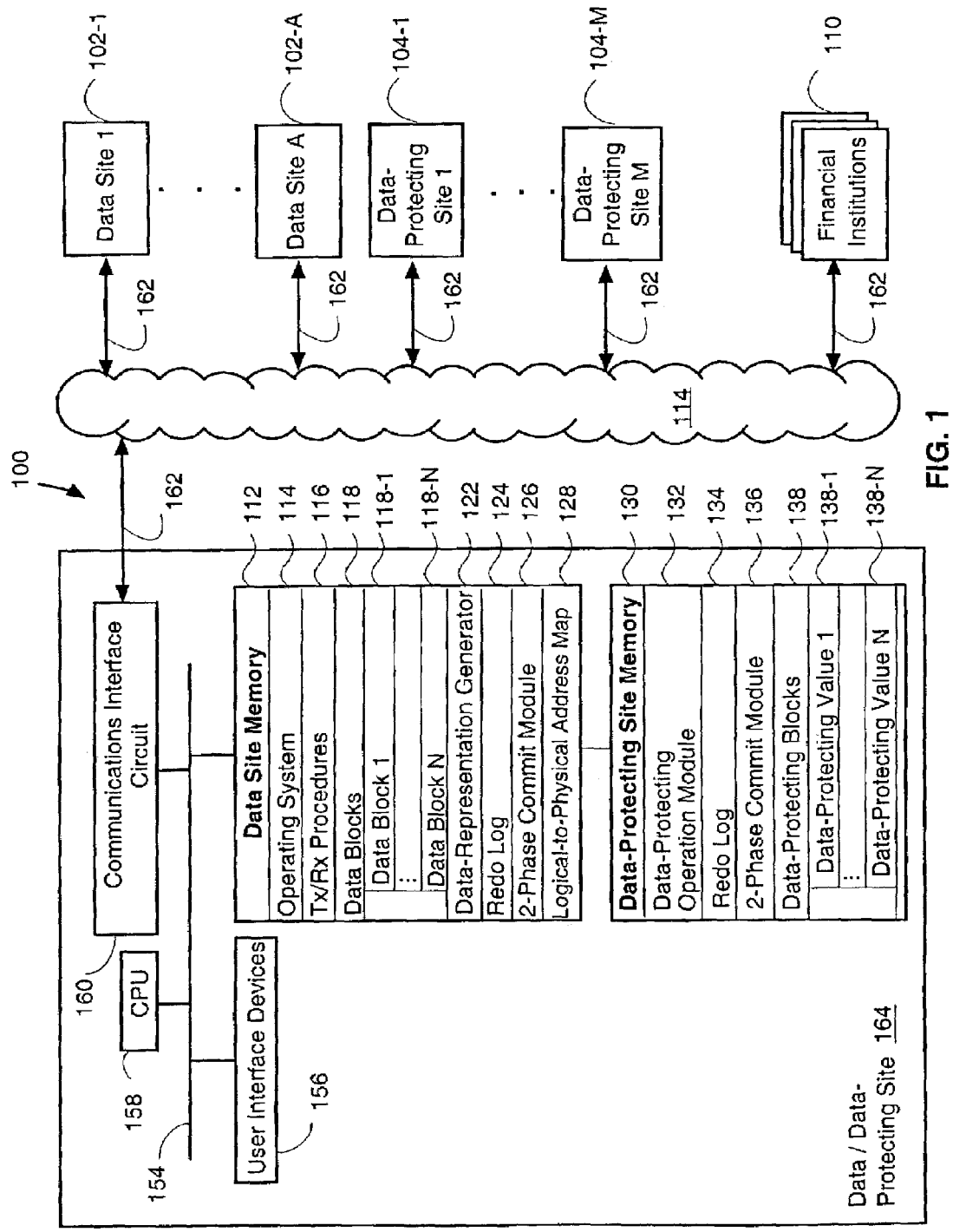
FIG. 1 is block diagram of a programmed general purpose computer that operates in accordance with an embodiment of the present invention.

In this description, the term "subset" is used generally to mean a portion of the thing, up to and including the entirety of the thing.

The present invention uses a set of geographically-diverse data sites and data-protecting sites to store data and redundant data. Blocks of data and blocks of data-protecting values are grouped together in redundancy groups, which have cross-site consistency among the data and its corresponding data-protecting values. An example of a data-protecting site is, in one embodiment, a checksum site that stores checksum values derived from performing XOR operations on delta values derived from new versions of data written to data sites.

In designing a data-storing system using erasure-code-based redundancy, one important design consideration is overall complexity, whether for local-area systems, or for geographically-diverse, wide-area systems, such as the type utilized by the present invention. The protocols between the two types of networks are quite different, and are affected by the communication medium of each. In a local-area parity scheme, the local-area network (LAN) connecting servers is assumed to be fast and cheap (e.g., Ethernet). Therefore, the design challenges lie in data layout, coordination across servers, cache coherence, and decentralization of control.

In contrast, for more geographically-diverse systems, the wide-area network (WAN) connecting sites is assumed to be slow and expensive (e.g., leased T1 or T3 lines). Consequently, applications running on each site are configured to be independent of applications running on other sites. In other words, a logical piece of data is not stored across multiple sites, but is instead kept on a single site. An example would be a hospital chain that has branches in multiple cities, with each branch having its own file system for local employees and patients. The data for a particular hospital branch would not be striped across multiple sites, but would instead stay locally at the branch. This is unlike the RAID-5 system mentioned in the Background, as that system stripes data and parity information across all the disks in the array.

Each data site of the present data-storage system may contain disks, servers, a LAN, and some local redundancy such as a hardware RAID-5 system. Also, each site is assumed to employ a storage-area network (SAN). Further, to ensure the recoverability of data on a data site, the corresponding data-protecting site that protects the data must be located separate and apart from the data site, such that if the entire data site fails, the redundant information remains intact.

In one embodiment, the difference between data sites and data-protecting sites may only be logical, where physical storage for redundancy information is merely added to existing data sites. In this manner, the storage layout of the local file systems does not have to be changed, and, at the block storage level, there is no issue about parallelism or single-system image across sites. Rather, the data-storage system of the present invention reliably and consistently delivers data to the remote data-protecting sites for protection while hiding the long latency of the WAN from the critical path of data access.

An example of a data/data-protecting site in the data-storing system of the present invention is shown in FIG. 1. As shown, a series of data sites 102-1 . . . 102-a and data protecting sites 104-1 . . . 104-m communicate across a geographically-diverse wide-area network 114 (such as the Internet, an intranet, or an extranet), through bidirectional communication channels 162. Collectively, the data sites and data-protecting sites comprise the data-storing system 100 of the present invention, which may be utilized by, for example, financial institutions 110 to store data from a multitude of branch offices. In this case, each branch office would store all of its data on a local data site 102, but the corresponding data-protecting site 104 storing the redundant data for the local data site would be geographically diverse to ensure tolerance failure and data recoverability.

While shown in FIG. 1 as actual separate entities, a data site and a data-protecting site may be only logically distinct, as described above, in accordance with one embodiment of the present invention. Thus, as shown by data/data-protecting site 164, a particular local data site can also act as a data-protecting site for data stored at other sites. The data/data-protecting site 164 is typically a general computer system or a database capable of practicing the present invention. Data/data-protecting site 164 contains one or more central processing units (CPU) 158, a communications interface circuit 160, optional user interface devices 156, and memories 112 and 130 (typically including high-speed random access memory and non-volatile memory, such as disk storage), all of which are interconnected by one or more system busses 154. The communications interface circuit 160 connects the data/data-protecting site to wide-area network 114 through bi-directional communication channels 162.

The data site memory 112 stores an operating system 114, transmit and receive procedures 116, and a set of data blocks 118 comprising the local data actually stored in the memory, such as data blocks 118-1 . . . 118-N. The data site memory 112 also stores a data-representation generator 122, a redo log 124, a two-phase commit module 126, and a logical-to-physical address map 128.

The data-protecting site memory 130 stores a data-protecting operation module 132, a redo log 134, a two-phase commit module 136, and a set of data protecting blocks 138 comprising data-protecting values 138-1 . . . 138-N (as well as additional information—not shown).

Each block of data in a data site participates in precisely one cross-site redundancy group. A cross-site redundancy group is a set of blocks, one per site, of which one or more are data-protecting blocks. Thus, the blocks in a given group protect one another's data. The simplest example is single parity, in which one of the blocks is the XOR of the others. The system can reconstruct the current, correct contents of a lost site on a replacement site using the parity information and the surviving data.

On the other hand, much greater disaster tolerance can be achieved by using more redundancy. For instance, all but two of the blocks in every cross-site redundancy group can be used for data, and the remaining two blocks can be used as checksums computed using a Reed-Soloman erasure code (i.e., a well-known set of erasure codes corresponding to various algorithms). This type of the system can recover from up to two site losses. Stated more generally, to achieve fault tolerance for up to n faults, n data-protecting sites must be utilized in the data-storing system.

In summary, an application using the data-storage system of the present invention should satisfy two properties:

(1) Dispersed Data. In the data-storing system, data is dispersed over multiple sites. The data-storing system requires as few as two sites (single redundancy) or three sites (double redundancy), but the efficiency gains of the data-storing system (as compared with mirroring) are more compelling when there are more total sites—e.g., five sites. In addition, the amount of data at each site should be roughly equal; otherwise, the efficiency gains are reduced.

(2) Local Computation. In the data-storing system, the results of computations on data are stored along with the data. In other words, an application running at a given site does not access data at other sites. This assumption is motivated by economics: if computations are not local, the cost of WAN bandwidth is likely to exceed the cost benefits of the present data-storing system, which result from using less physical storage than a traditional mirroring system.

The types of entities that would use the data-storing system of the present invention would typically have several different sites, each of which runs its own applications and storage system. For example, different sites might perform various payroll, finance, and technical functions. Alternatively, like with the example of a hospital chain mentioned earlier, the sites could be running independent instantiations of the same application, but using only local data. Another potential user of the present data-storing system would be an application service provider (ASP) or storage service provider (SSP) that wants to offer disaster tolerance to their customers cost-effectively.

We now turn to specific details about the data-storing system layout, and data update and recovery protocols.

System Layout

At each data site of the data-storing system, the local storage system provides a logical disk abstraction to its clients, in accordance with one embodiment of the present invention. Clients see only a logical address space divided into blocks of some fixed size, referred to as logical blocks. Each logical block is identified by its logical address. While clients read or write logical blocks, the data-storing system manages the actual physical placement of the blocks. Additionally, each cross-site redundancy group is globally identified by a group id, and each data block is identified by its site and site-specific logical address.

As mentioned above, to tolerate at most m simultaneous site disasters, each group should consist of n (n>1) data blocks and m (m>1) data-protecting blocks for a geoplex with n+m sites. To encode the data-protecting values, a Reed-Soloman erasure code is utilized to allow incremental updates. In other words, a data-protecting site can compute a new data-protecting value using the old data-protecting value and the XOR between the old and new contents of the data block updated, instead of computing the new data-protecting value from scratch. At m=1 (i.e., one data-protecting site), this scheme is based on parity.

Blocks in a redundancy group can be grouped in various schemes. In one embodiment, the data-protecting blocks are distributed so that they rotate among the sites, as well as among the logically-consecutive data blocks at each individual site. This is accomplished by using a simple static function to map each data-protecting block to a group number and a site number. For example, assume that the data-protecting sites for group g are sites: (g−j) mod n+m (where $0 \leq j \leq m$). Then, the bth data block at site s is mapped into group g, defined as follows:

$$g = \begin{cases} b + m*(\lfloor (b-s)/n \rfloor + 1) & s \leq n, \\ b + s - n + m*\lfloor b/n \rfloor & s > n \end{cases}$$

Formulas to compute b from s and g can be derived from these definitions, as well.

Figure 2:
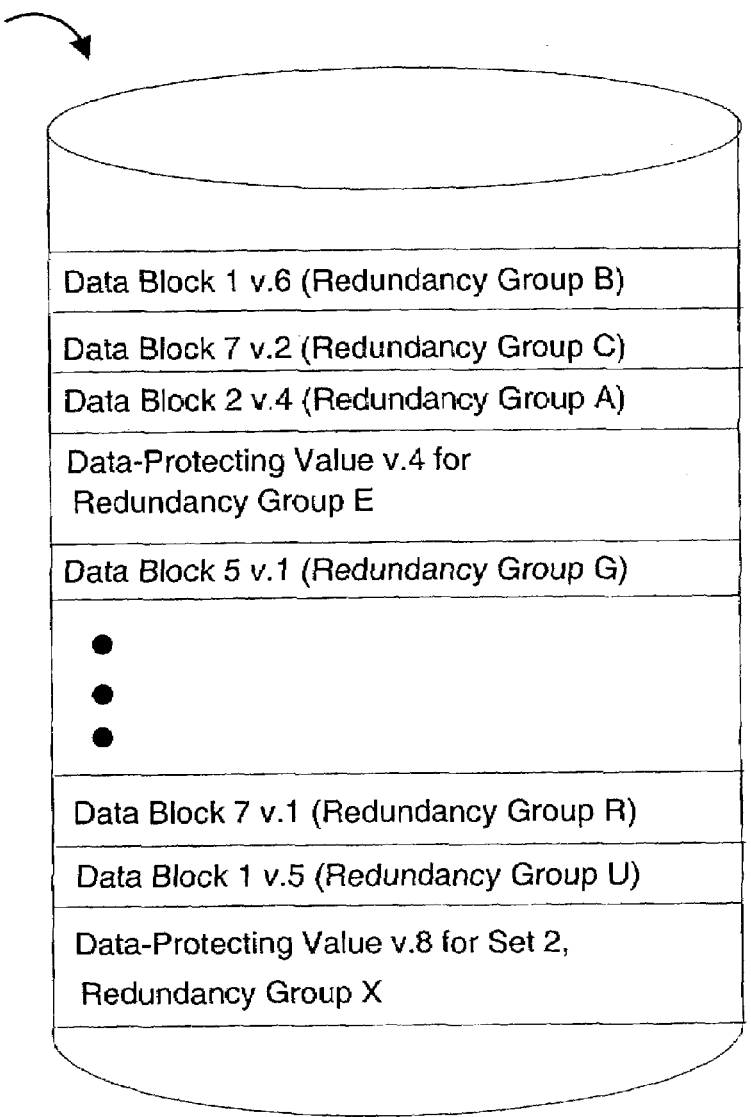
FIG. 2 is a block diagram example of a hard disk, or other storage device, with multiple data and data-protecting blocks corresponding to various redundancy groups in a data-storing system, in accordance with an embodiment of the present invention.

An exemplary data block and data-protecting block layout on a hard disk 200 is shown in FIG. 2. In this example, hard disk 200 stores a number of different data blocks, identified by an identification number and version number (e.g., data block 1 version 6). Note that each data block corresponds to a particular redundancy group, and that there is only one data block on the hard disk corresponding to each redundancy group. (The actual association with the redundancy group is not necessarily stored on the hard disk, and is shown for explanation purposes only). Hard disk 200 also contains several data-protecting values, which correspond to a redundancy group, or to a consistent set of a redundancy group (more details on consistent sets are provided below). Note that the redundancy groups protected by the data-protecting values are not the same redundancy groups of any data block on the same hard disk. This is because, as previously described, data-protecting values must be geographically separate from the data blocks they protect.

Updating Data Blocks

When a client updates a data block, the corresponding data-protecting blocks must be updated. This creates two challenges that are not found with remote mirroring. First, unlike a mirror update, the incremental calculation of a data-protecting value is not idempotent, and so must be applied exactly once. Second, a data-protecting value protects unrelated data blocks from different sites; therefore, the update and recovery processes of a data block may interfere with those of other blocks in the same redundancy group. For example, inconsistency between a data block and its data-protecting value affects all data blocks in the group, while inconsistency between a data block and its mirror affects no other blocks.

Therefore, the data-storing system of the present invention is designed to ensure the idempotent property of each data-protecting value update, and to isolate as much as possible the update and recovery processes of each data block from those of others. And, as in remote mirroring cases, the data-storage system attempts to minimize the degradation of local write performance. To meet these requirements, the data-storing system ensures that redundancy groups are always "consistent," and hence can be used for recovery whenever needed. Consistency will be explained next, before discussing an example of an update protocol.

Consistency

To maintain consistency, every new version of a data block is written to a new physical location instead of overwriting the old content in place—a technique known as "shadow paging" or "versioning." This helps ensure that at least one "stable" version of each data block exists at all times. (A version of a data block is stable if all data-protecting sites are capable of providing a consistent data-protecting value for that version at that time). Each new version is identified by a sequentially-increasing version number.

To help explain consistency, the following definitions are useful:

n is the number of data blocks in a redundancy group;
m is the number of data-protecting blocks in the redundancy group;
$d_i$ (where $1 \leq i \leq n$) is the content of the ith data block;
$c_j$ (where $1 \leq j \leq m$) is the content of the jth data-protecting block (e.g., a data-protecting value); and
$C_j$ (where $1 \leq j \leq m$) is the jth data-protecting operation (e.g., a checksum operation).

Based on these definitions, the group $\{d_1 \ldots d_n, c_1 \ldots c_m\}$ is "consistent" if and only if for every j (where $1 \leq j \leq m$), $C_j = \{d_i\}$ (where $1 \leq i \leq n$). Also, the data-protecting values, i.e., $c_j$ (where $1 \leq j \leq m$), are consistent with each other if and only if they belong to the same consistent group.

For a particular data-protecting value $c_j$ to be considered consistent with a particular version of data block $d_i$, and vice-versa, there must be versions of other data blocks in the same redundancy group that are consistent with the data-protecting value $c_j$. For example, in a redundancy group including versions of data blocks d1, d2, and d3, the block d1_0 (i.e., data block 1 version 0) can only be consistent with data-protecting value c1 if there are other versions of other blocks in the group that are also consistent with c1 (e.g., c1=C(d1_0, d2_m, d3_n)). Furthermore, a particular version of a data block is "stable" at a given time if and only if all data-protecting sites are capable of providing a consistent data-protecting value for that version at that time. If a data version has not been stable, it is referred to as "outstanding."

However, the fact that every data-protecting site is capable of providing a consistent data-protecting value for every data block in a redundancy group does not guarantee group consistency. This is because a data-protecting site may not be capable of providing a data-protecting value that is consistent with all data blocks in a redundant group, but rather just different subsets of them. For example, consider a redundancy group that includes data blocks/versions d1_0, d2_0, and d3_0, and a data-protecting site that can provide data-protecting values c1, c2, and c3 (i.e., three different versions of a data-protecting value c). If c1=C(d1_0, d2_1, d3_1), and c2= C(d1_1, d2_0, d3_1), and c3=C(d1_1, d2_1, d3_0), then the redundancy group (d1, d2, d3, c) is not consistent even through the three versions of the data-protecting value c (c1, c2, c3) are consistent with each of d1_0, d2_0, and d3_0 independently. If, however, there is another data-protecting value c4=C(d1_0, d2_0, d3_0), then the group would be consistent.

The principal use of consistency is to implement the following two invariants in the update protocol of embodiments of the present invention:

(1) At any time, at least one stable version of each data block exists.

(2) If a data-protecting site is capable of providing a consistent checksum for each individual data version in the group S, then the site is capable of providing a consistent checksum for the entire S.

As a result of the first invariant, there exists a set S* (the "*" denotes stable)= $\{d^*_i\}$ (where $1 \leq i \leq n$), where each data-protecting site is capable of providing a consistent data-protecting value for each individual data version $d^*_i$ in S*. Further, as a result of the second invariant, each data-protecting site j is capable of providing a consistent data-protecting value $c^*_j$ for the entire S*. And, finally, the end result of the consistency framework (and the corresponding invariants) is that a stable redundancy group is, by definition, consistent. In other words, $\{d^*_1 \ldots d^*_n, c^*_1 \ldots c^*_m\}$ is consistent.

Operation

Figure 3:
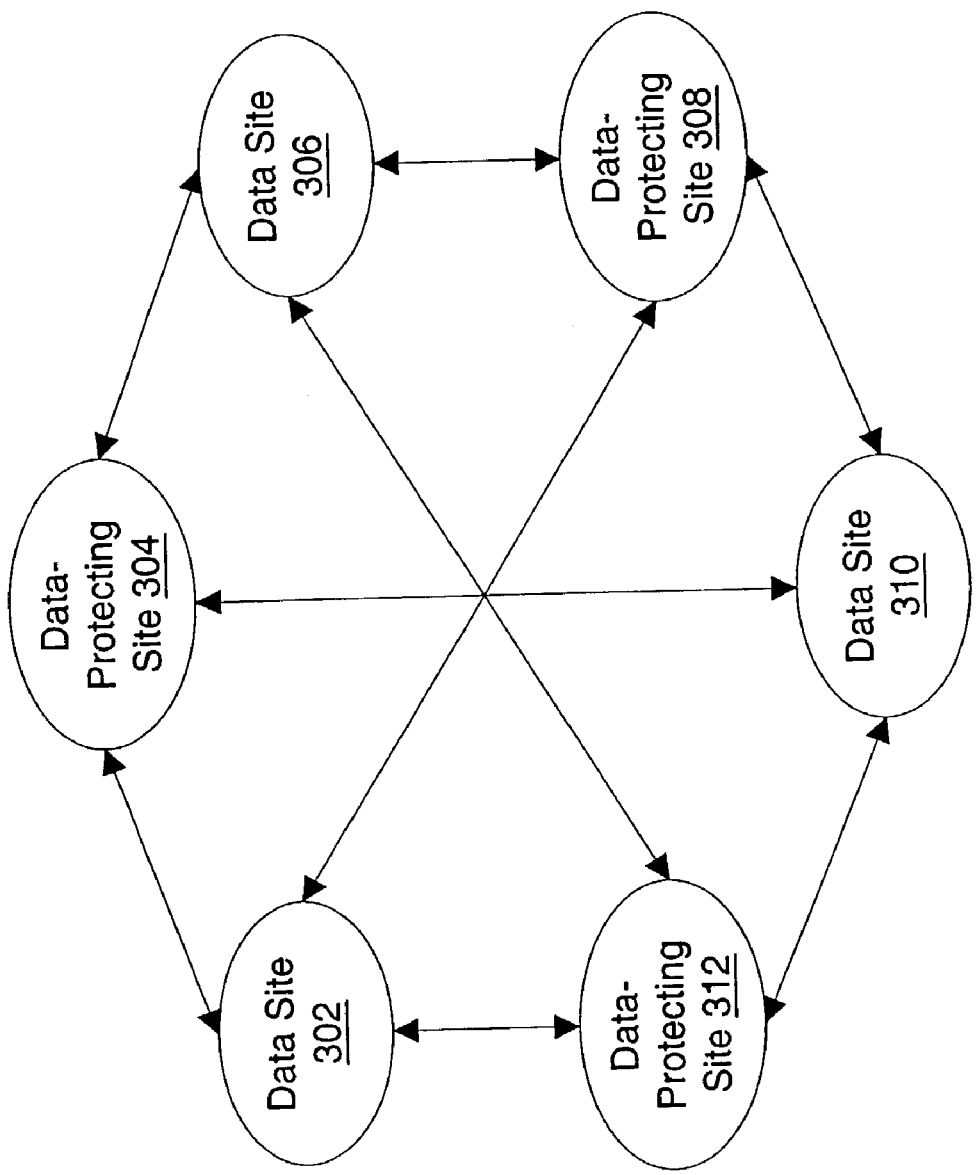
FIG. 3 is a schematic of one example of a data-storing system configuration in accordance with an embodiment of the present invention.

In operation, every time a client writes a new version of a data block to the local data site, that data site must provide a representation of that new version to each of the data-protecting sites in the corresponding redundancy group, for computing a new data-protecting value. But, to ensure stability of at least one version of the data block being written, the receiving data-protecting sites do not immediately commit the representation to memory and generate the updated data-protecting value. Instead, a procedure called a two-phase commit is used, involving bi-directional communications between the data site and the one or more data-protecting sites. An example of the communication paths between three data sites (302, 306, and 310) and three data-protecting sites (304, 308, and 312) is shown in FIG. 3.

One inefficient way of guaranteeing that at least one stable version per block exists (in accordance with invariant #1) is to keep all old versions and their checksums. However, this would require far too much storage space, and thus it is far more efficacious to delete old versions and reclaim their physical storage as soon as a new stable version is created. To achieve this goal, while still maintaining invariant #1, the two-phase commit protocol is used. Generally, in the "prepare phase" of the two-phase commit, each site writes enough information to local non-volatile storage to ensure that, in the face of system crashes and reboots, the site will be capable of providing either the new data version being written (if it is a data site), or a consistent data-protecting value for the new data version (if it is a data-protecting site). (Depending on when the crash occurs, however, the consistent data-protecting value may have to be constructed from versions of the data block and/or data-protecting value first). When all sites have reached the commit point (i.e., when they have completed the writes), they proceed to the "commit phase," and delete the old versions.

By using the two-phase commit procedure, communications across sites may be delayed if site/network outages occur, but will then proceed and the unnecessary blocks will be reclaimed once the communications are reestablished. The update process for a new data version will be aborted only if there is a site outage in the redundancy group during the prepare phase and, as a result, there are not enough surviving sites to recover the new version. If the process is aborted, the new version will be deleted and the old kept.

An example of a protocol demonstrating the two-phase commit procedure used to update a data block in the present data-storing system is set forth below. An explanation follows. Also, note that while reference is made to "checksum sites," this is just a particular type of data-protecting site.
1. ClientWrite(laddr, new_data)
2. DiskWrite(new_paddr, new_data)
3. AddToLog(laddr, new_vernum, new_paddr)
4. ClientWrite Completed
5. DiskRead(old_paddr)→second_newest_data
6. Second_newest_data⊕new_data→delta representation
7. UpdateRequest(data_site_id, laddr, new_vernum, delta)
8. DiskWrite(delta_addr, delta)
9. AddToLog(group_id, data_site_id, new_vernum, delta_addr)
10. UpdateReply(checksum_site_id, laddr, new_vernum)
11. UpdateMap(laddr, new_paddr, new_vernum)
12. FreeBlock(old_paddr)
13. CommitRequest(data_site_id, laddr, new_vernum)
14. RemoveFromLog(laddr, new_vernum)
15. DiskRead(checksum_addr)→old_checksum
16. ChecksumOp(old_checksum, delta)→new_checksum
17. DiskWrite(checksum_addr, new_checksum)
18. UpdateMap (group_id, data_site_id, laddr, new_vernum)
19. FreeBlock(delta_addr)
20. RemoveFromLog(group_id, data_site_id, new_vernum)

Figure 4:
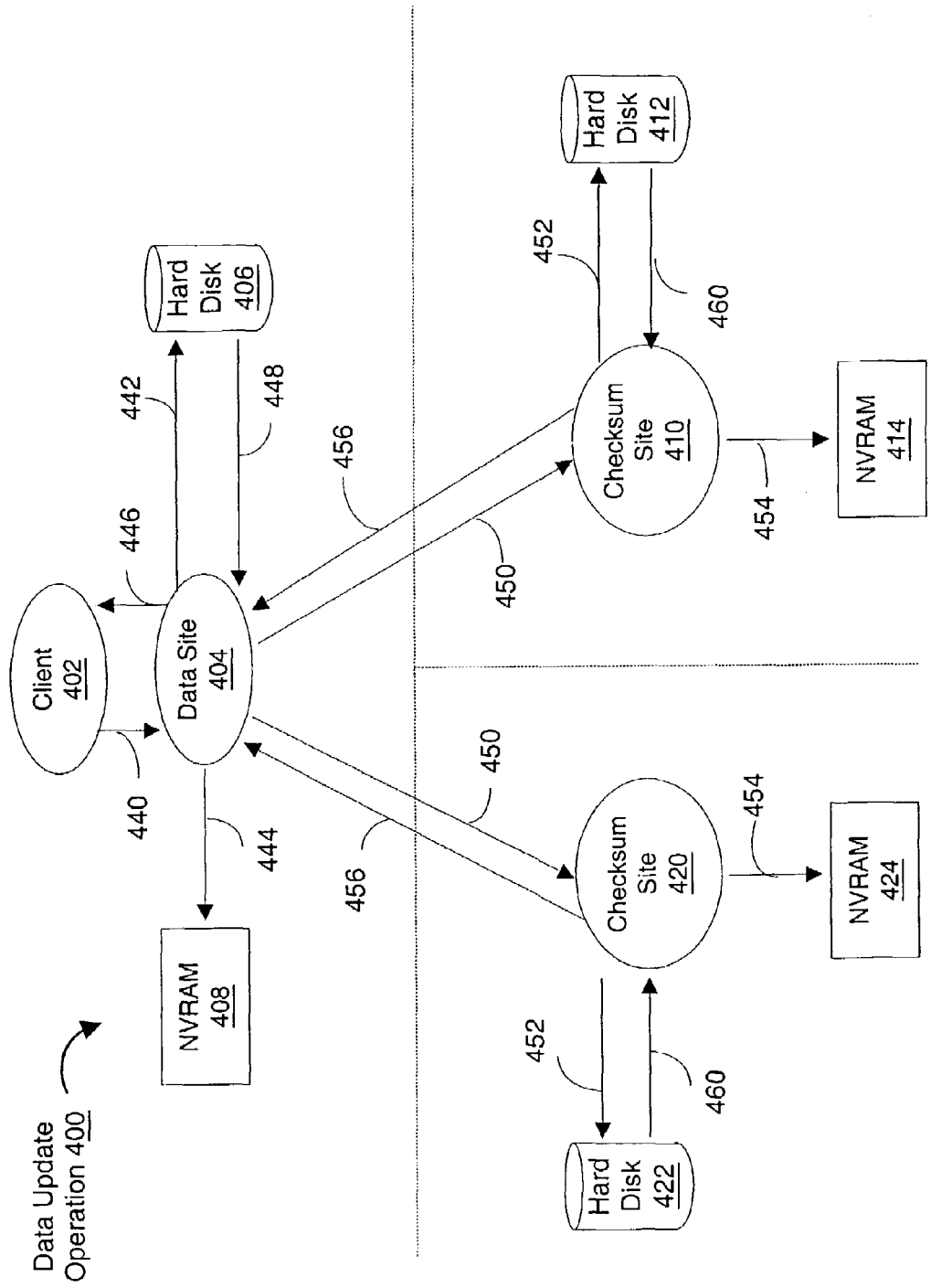
FIG. 4 is a schematic of one example of information flow in a data-storing system during a data update operation, in accordance with an embodiment of the present invention.

The protocol will be explained in conjunction with FIG. 4, which shows the sequence of communications undertaken in a data-update operation 400 corresponding to the protocol above.

The protocol begins upon receipt of a ClientWrite command, specifying new data and a logical address. (Note: the appropriate step 1–20 of the protocol above, followed by the corresponding communication in FIG. 4, will be specified after a step is explained—i.e., step 1; 440). The data-storing system then performs a DiskWrite, writing the new data to a physical address (step 2; 442). Next, the data-storing system logs the new data in a "redo log" by storing the logical address, the version number of the data block being written, and the new physical address in the log (step 3; 444).

The redo log at the data site 404 is stored in non-volatile RAM 408, and is used to ensure that system crashes occurring during a two-phase commit procedure will not result in a loss of the data being written before that data has been "committed" to hard disk memory. An entry in the log on a data site is created after an outstanding data version is written to disk, and is deleted after update replies are received back from all checksum sites, indicating that the corresponding checksum has been committed. Each entry in the log contains a list of data structures for outstanding versions of the block. (Recall that "outstanding" versions are those that are not yet stable). The list of data structures may include the outstanding version number, the physical address of the outstanding version of the block, and the status of each checksum site regarding the remote update of this version. The status is "ready" if an update reply from a checksum site has been received, or "pending" otherwise.

The redo log is a form of metadata. Storing the redo log, together with other metadata such as logical-to-physical maps, in a permanent storage system that provides higher reliability than for regular data protects against inaccessibility of the regular data due to loss of metadata. The metadata also needs to be cached in memory for fast reads and batched writes to disk. Ideally, the metadata is cached in non-volatile memory and backed up by triple mirroring disks, assuming that the regular data is stored on RAID-5 disks.

Returning back to the protocol, once the initial three steps of the protocol have been completed, the ClientWrite is complete (step 4; 446). This is significant because the client can now return with assurance that, through the two-phase commit process being described, the data just written should not be lost or unprotected. This is enabled in part because of the shadow versioning described above where, instead of overwriting a previous version of a new data block with a new version, the new version is written to a different physical address. In other words, the data-storing system of the present invention forms redundancy groups with logical blocks that may have multiple versions coexisting simultaneously. Thus, the local write can return immediately after a single I/O, without having to read the previous version from disk and computing the delta before overwriting the data block in place.

Next, the second newest data version (i.e., the previous version) is read from the disk at the old physical address (step 5; 448). Then, the second newest data version is XORed with the new data (i.e., the new version) to generate a delta representation (step 6). As will be explained in further detail, the delta representation (also referred to herein as a representation) is an intermediate value that is transmitted to the checksum sites and used to compute the checksums (i.e., the data-protecting values), but is ultimately not permanently stored on disk.

Next, the local data site 404 sends an UpdateRequest command to each checksum site, including an ID number identifying itself, the logical address of the data block being updated, the version number of the data block being updated, and the delta (step 7; 450). (Note that, because the delta is computed from an XOR operation, consecutive writes to the same data block can be collapsed into one update request unless they straddle a synchronize instruction, as will be explained below in the context of serialization of remote updates). Each checksum site writes the data delta into a free block on its local disk (step 8; 452), distinct from other stored deltas corresponding to other data blocks in the redundancy group. Thus, because the delta of each data block in the same redundancy group is stored independently, the checksum site is capable of computing a new checksum with the old checksum and any combination of the other deltas, thus maintaining invariant #2.

After writing the delta to disk, each checksum site then logs the delta into its own redo log, including the redundancy group ID, the data site ID, the new version number corresponding to the delta, and the address of the delta (step 9; 454). Like the redo log of the data site 404, the redo logs of checksum sites 410 and 420 are stored in non-volatile RAM (i.e., in NVRAM 414 and 424). Then, once the delta information has been written to its log, each checksum site replies to the data site that it is now capable of providing a checksum for the new version of the data block (step 10; 456). The reply message includes an ID of the checksum site, as well as the logical address and version number of the data block for which the checksum site can compute the checksum.

Back at the data site, when all reply messages are received from all checksum sites, the data site updates its logical-to-physical address map to cause the logical address for the data block to now point to the physical address of the new data version, and to identify its version number (step 10; 444). In other words, the data site makes the new version the stable version. It is now safe to make this "commit" because all of the checksum sites are themselves at the commit point, such that they would be able to generate a checksum for the new data version, even if the system crashed. The data site also frees the physical block that stored the old version (step 11), and sends a commit request to each checksum site that includes the data site ID, the logical address, and the version number of the data version to commit (step 11; 450). Finally, the data site removes the outstanding version from the log (step 14; 444).

When each checksum site receives the commit request, it first conducts a disk read to obtain the old checksum value for that data block (step 15; 452). Then, the checksum site conducts a checksum operation on the old checksum value and the delta to generate a new checksum (i.e., a new data-protecting value) (step 16). The type of checksum operation depends on the erasure code used. In the present example, the checksum operation is simply an XOR function of the old checksum and the delta. Other embodiments use more complicated Reed-Soloman erasure codes.

The new checksum is then written to disk over the old checksum corresponding to the data block (step 17; 452). Also, a map at each checksum site is updated to identify the version number, originating data site, logical address, and group ID number of the data block corresponding to the new checksum (step 18; 454). The checksum site maintains separate map entries, including version numbers, for each data block contributing to the value of the checksum. In other words, if a checksum protects four data blocks, then the map kept at that checksum site will maintain version numbers for all four data blocks for that checksum. This will help in data recovery, as explained below.

Finally, the checksum site releases the storage corresponding to the stored delta (step 19), and removes the group ID, data site ID, and new version number corresponding to the delta from the log (step 20; 454).

Figure 6:
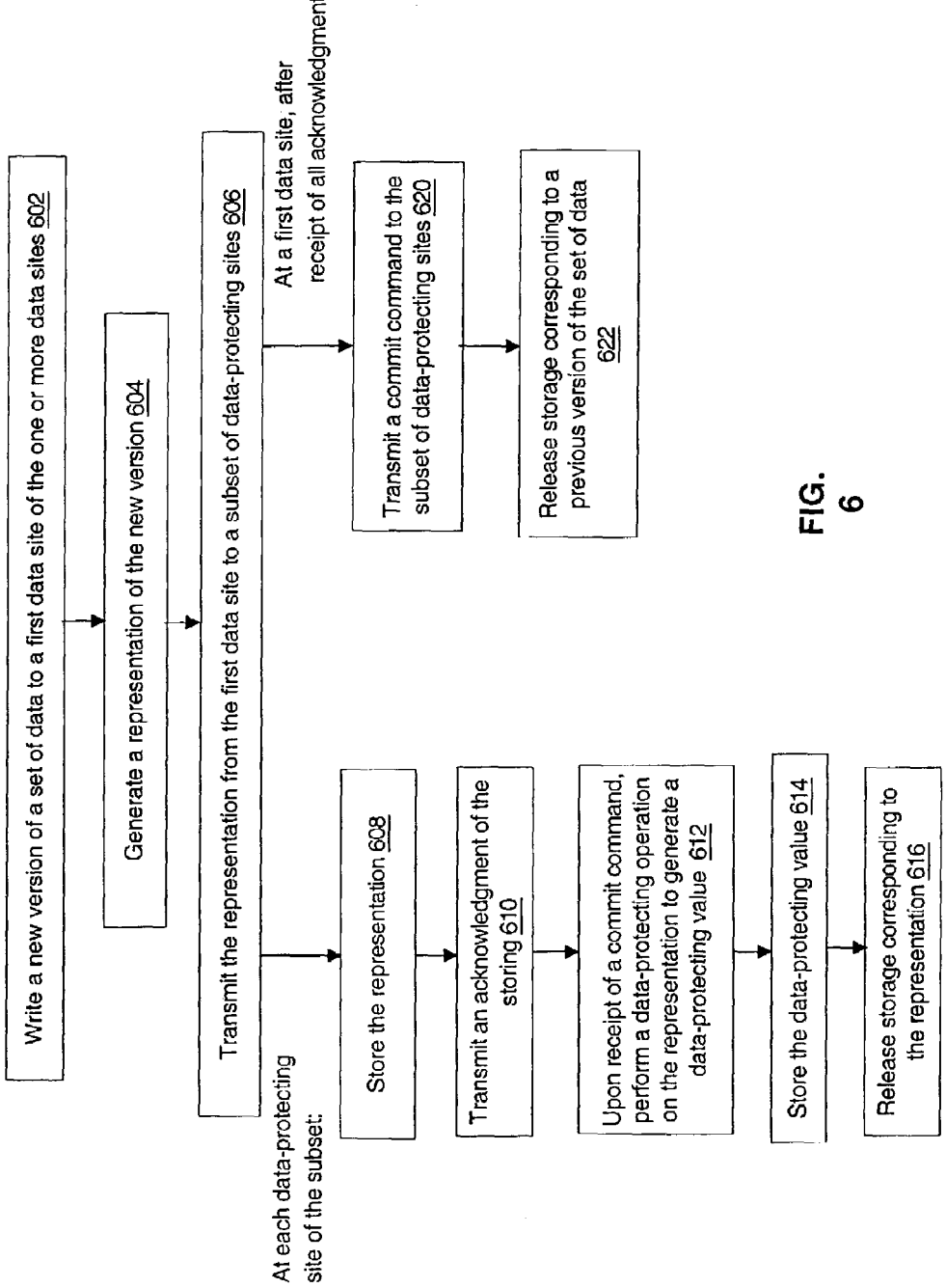
FIG. 6 is a flowchart showing an example of a method of redundantly storing data in a geographically-diverse data-storing system, in accordance with an embodiment of the present invention.

Another example of a method of redundantly storing data in a geographically-diverse data-storing system is shown in FIG. 6. As shown, the data-storing system first writes a new version of a set of data to a first data site of the one or more data sites (602). Then, the data-storing system generates a representation of the new version (604). The representation is transmitted from the first data site to a subset of the data-protecting sites (606). At each data-protecting site of the subset, the data-protecting site: stores the representation (608); transmits an acknowledgement back to the first data site (610); upon receipt of a commit command, performs a data-protecting operation on the representation to generate a data-protecting value (612); stores the data-protecting value (614); and releases storage corresponding to the representation (616).

Further, in this method, at a first data site, after receipt of acknowledgments from each of the data-protecting site, the first data site transmits a commit command to the subset of data-protecting sites (620), and releases storage corresponding to a previous version of the set of data (622).

As demonstrated in the protocol and method described above, there will always be a stable version of every data block through the use of the two-phase commit procedure, because in the transition phases of computing the deltas and new checksums, the outstanding versions are not yet logged as the stable versions. The redo logs chart the progress of the conversion of outstanding versions and checksums to stable ones. Operation of the redo logs will be explained next.

Redo Log Operation

The redo log will be scanned during a system reboot or a network reconnect. For a data site, as described, an entry in the log is created after an outstanding data version is written to disk, and is deleted after update replies are received from all checksum sites. Thus, the presence of such an entry during system reboot or network reconnect indicates that data delta should be resent to all checksum sites with a "pending" status. For a checksum site, an entry in the redo log is created after the delta is written to disk, and deleted after the checksum is recomputed with the delta and stored on disk. Therefore, the presence of such an entry during a system reboot or network reconnect indicates that an update reply should be resent to the data site.

The redo logs can also be used to detect duplicate messages and hence to ensure idempotent updates. Upon receiving an update request with an outstanding version number, a checksum site first checks if the version number already exists in the redo log. If it does, the checksum site determines if it has already committed the delta, and if it has, resends an update reply to the data site. When the data site receives the update reply, it first looks up the redo log for a corresponding entry. If none is found, the data site determines that the outstanding version has already been committed locally, and thus resends a commit request to the checksum site. Upon receiving a commit request, a checksum site tries to locate a corresponding entry in the outstanding log. If it fails to locate such an entry, the checksum site determines the version has already been committed, and therefore ignores the request.

Recovering Data and Data-Protecting Blocks

Cross-site recovery is initiated when a site loses data that cannot be recovered using local redundancy. The recovered data can be stored either on the same site as the lost data, or on a new site if the old site is destroyed completely. In either case, the site where the recovered data is to be stored serves as the "coordinator" during the recovery process. The coordinating site can be selected automatically, in the case of a fast failover, or can be selected by a network administrator who selects the coordinating site based on factors including financial and temporal reasons. The designation of a coordinating site in a recovery operation might not occur until the damaged site is repaired, or an entirely new site may have to be rebuilt.

During recovery, the metadata (e.g., the redo logs and the logical-to-physical maps) will generally not need to be recovered, because it is stored with high local reliability and should not be lost unless a site suffers a complete disaster. Thus, in the recovery protocol, no attempt is made to recover metadata from remote sites. In the event of a site disaster, the metadata is rebuilt from scratch.

An example of a protocol demonstrating a recovery procedure to recover a data block is set forth below. An explanation follows.

1. SelectCoordinator
2. SelectLogicalAddressesToRecover
3. VersionNumbersRequest(data_site_id, group_id)
4. ReadLog(group_id, data_site_id)→vernums
5. ReadMap(group_id, data_site_id)→new_vernum; and new_vernum+vernums→vernums;
6. SuspendCommitOperations(group_id, data_site_id)
7. VersionNumbersReply(checksum_site_id, vernums)

8. StableVersionNumbersRequest(data_site_id, group_id)
9. ReadMap(group_id)→stable_vernum
10. StableVersionNumbersReply(data_site_id, stable_vernum)
11. DetermineNewestRecoverableVersion(newest_recoverable_vernum); and CreateVersionVector (newest_recoverable_vernum, stable_vernum);
12. CorrespondingChecksumRequest(data_site_id, group_id, version_vector)
13. DiskRead(checksum_addr)→corresponding_checksum
14. (conditional) ChecksumOp(corresponding_checksum, delta)→corresponding_checksum
15. NewChecksumRequestReply(checksum_site_id, group_id, corresponding_checksum)
16. StableDataRequest(data_site_id, group_id, stable_vernum)
17. ReadMap(group_id)→stable_paddr
18. DiskRead(stable_paddr)→stable_data
19. StableDataRequestReply(data_site_id, group_id, stable_data)
20. RecoverLostData(corresponding_checksum, stable_data)
21. SynchronizeRequest(version_vector)
22. Commit(checksum_addr, corresponding_checksum) (steps 17–20 of update protocol)

Figure 5:
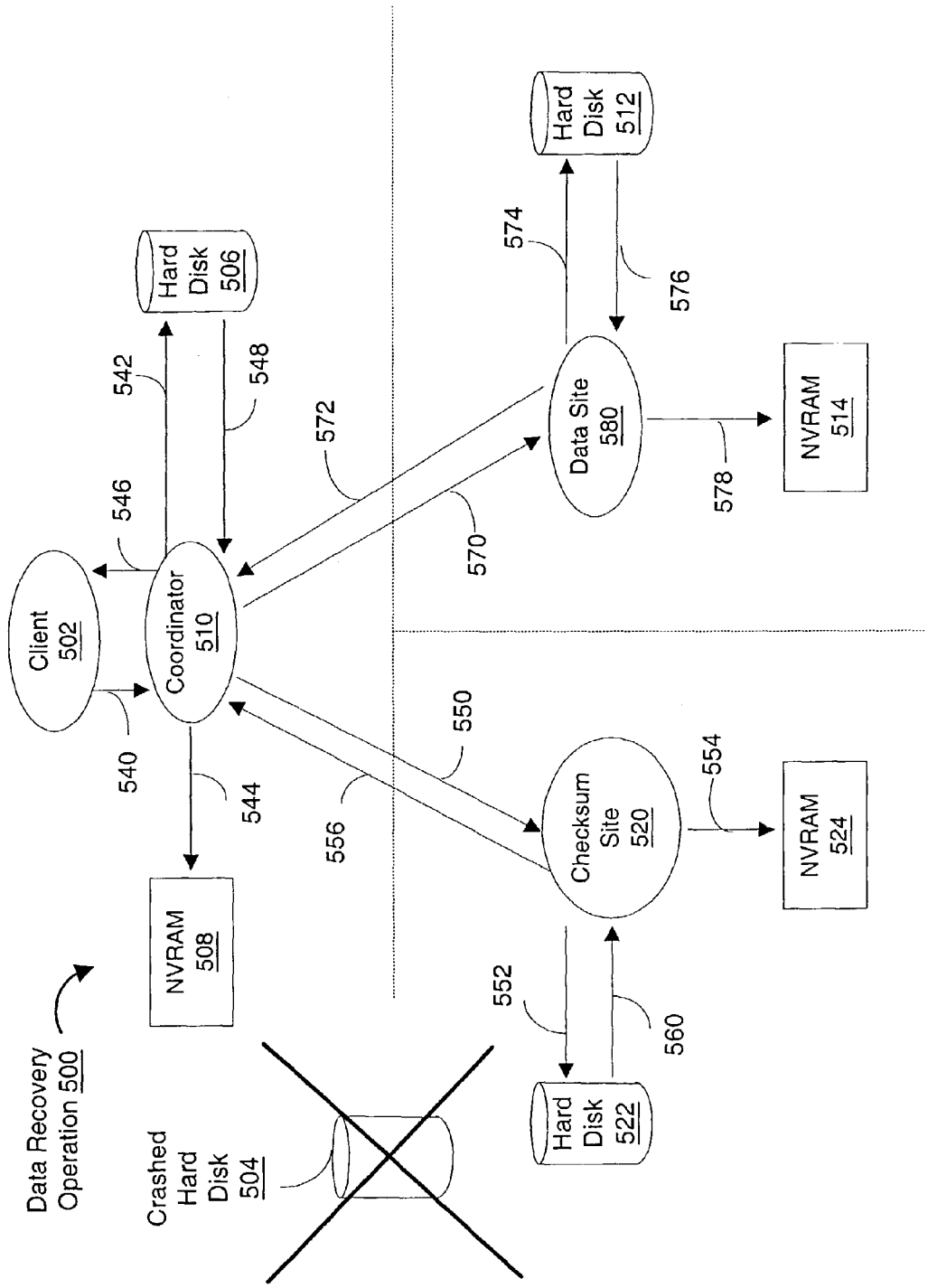
FIG. 5 is a schematic of another example of information flow in a data-storing system during a data recovery operation, in accordance with an embodiment of the present invention.

The protocol will be explained in conjunction with FIG. 5, which shows the sequence of communications undertaken in a data-recovery operation 500 corresponding to the protocol above. The data-storing system in FIG. 5 includes a crashed hard disk 504, a coordinator 510, a data site 580, and a checksum site 520. Like with the previous protocol, the steps of the protocol and the corresponding communication in FIG. 5 will be noted after an explanation of the step.

The protocol is initiated after a data site, or part of a data site, has crashed. In this example, hard disk 504 has crashed, and all blocks on the hard drive have been lost. (Also, in this example, the protocol relates to recovery of data blocks, not checksum blocks). The first step in recovery is to choose the coordinator for the cross-site recovery (step 1). Then, the coordinator must select the logical addresses to recover (step 2). If a site loses some storage devices but not its metadata (e.g., the redo logs and logical-to-physical address maps), the addresses of blocks on the lost devices can be determined by scanning the logical-to-physical map. If a site is completely destroyed, all blocks in the address range from zero to the capacity of the lost logical disk need to be recovered.

Next, to reconstruct a lost data block $d_i$, the coordinator requests the available version numbers of the lost data block $d_i$ from surviving checksum sites by sending a request message identifying the group ID of the lost block, as well as itself (i.e., its data site ID) (step 3; 550). When each checksum site receives the request for the available version numbers, it first checks its log to determine if a version number corresponding to a new delta for the lost data block $d_i$ has been logged (step 4; 554). Then the checksum site checks its logical-to-physical map to determine the version number of the lost data block stored for the current checksum, based on the group ID and data site ID of the lost data block (step 5; 554). The combination of the version numbers corresponding to the deltas, and the version number corresponding to the current checksum, are the available version numbers for the lost block $d_i$ (step 5). The checksum site then replies to the coordinator with the available version numbers for the lost data block (identified by group ID) (step 7; 556).

Also, each surviving checksum site temporarily suspends the commit operations for the data block involved (step 6). This way, the version ultimately selected by the coordinator for recovery (the "newest recoverable version") will still be available by the time the corresponding data is requested. Client writes and remote updates of the involved block are not suspended, however. Only the deletion of the old stable version is postponed.

The coordinator further requests the version numbers of stable data blocks of other blocks in the same group from other surviving data sites, by transmitting the group ID of the lost data block (step 8; 570). The surviving data sites receive the request, and then read their logical-to-physical address map to determine the version number of the corresponding stable data blocks in the group (step 9; 578). (This will work because the map only stores stable versions after they have been "committed" by the data site). Then, the data sites provide the logical address and version number of the stable data blocks of the group back to the coordinator (step 10; 572).

After receiving the available version numbers corresponding to the lost data block from the checksum sites, the coordinator determines the "newest recoverable version" for the lost data block (step 11). The newest recoverable version will be the newest version for which, if m data blocks are lost, at least m checksum sites are capable of providing a consistent checksum. The coordinator then assembles a "version vector" for each redundancy group containing lost block(s), consisting of the newest recoverable version for each lost data block in the group, as well as the stable version numbers of the other data blocks in the group (step 11).

After determining the version vector, the coordinator requests the checksum corresponding to the version vector from the checksum sites, identified by group ID and version vector (step 12; 550). The checksum sites conduct a disk read to read this checksum corresponding to the version vector, which may be the current checksum if it was fully committed before the data loss (step 13; 552). On the other hand, if there is no existing checksum corresponding to the version vector (i.e., if the commit process was stopped before the checksum could be computed from the delta), then the data site will first perform a checksum operation on the current checksum and the delta (corresponding to the newest recoverable version) to generate the new checksum (step 14). The checksum sites then reply with the corresponding checksum back to the coordinator (step 15; 556).

Next, the coordinator requests the stable data blocks from the surviving data sites, identified by group ID and stable version number (step 16; 570). The data sites read their logical-to-physical map to identify the physical addresses of the stable data block (step 17; 578), and then conduct a disk read to read the contents of the stable data blocks (step 18; 576). Finally, the data sites reply back to the coordinator with the stable data blocks (identified by group ID of the redundancy group) (step 19; 572).

Finally, after assembling all pertinent checksums and stable data blocks corresponding to the redundancy group of the lost block $d_i$, the coordinator recovers the lost data block (step 20). In one embodiment, this occurs by performing an XOR operation with the stable data block and the corresponding checksums (i.e., the data-protecting values) of the version vector, which will regenerate the lost data. The coordinator then attempts to synchronize all checksum sites with the recovered data version—i.e., to commit the recovered version and to delete other (older or newer) versions, if there are any (step 22; 550).

In response, each checksum site determines the corresponding checksum if necessary (this may have to be computed), and then compares it to the current checksum. If the corresponding checksum has not yet been committed, the checksum site implements steps 17–20 of the update protocol to commit it. The checksum site also deletes any deltas that are newer than the corresponding checksum. In this manner, each checksum site should be synchronized with the now-recovered data block $d_i$. The coordinator also uses the redo log to ensure eventual synchronization in the face of site or network outages.

While this protocol is one example of an embodiment of the present invention, it is meant only as an example. In other embodiments, other algorithms may be used to determine the optimum version to recover (i.e., the newest recoverable version), based on factors like the amount of traffic on sites being used for recovery, and the computational resources required to determine different versions of lost data.

Figure 7:
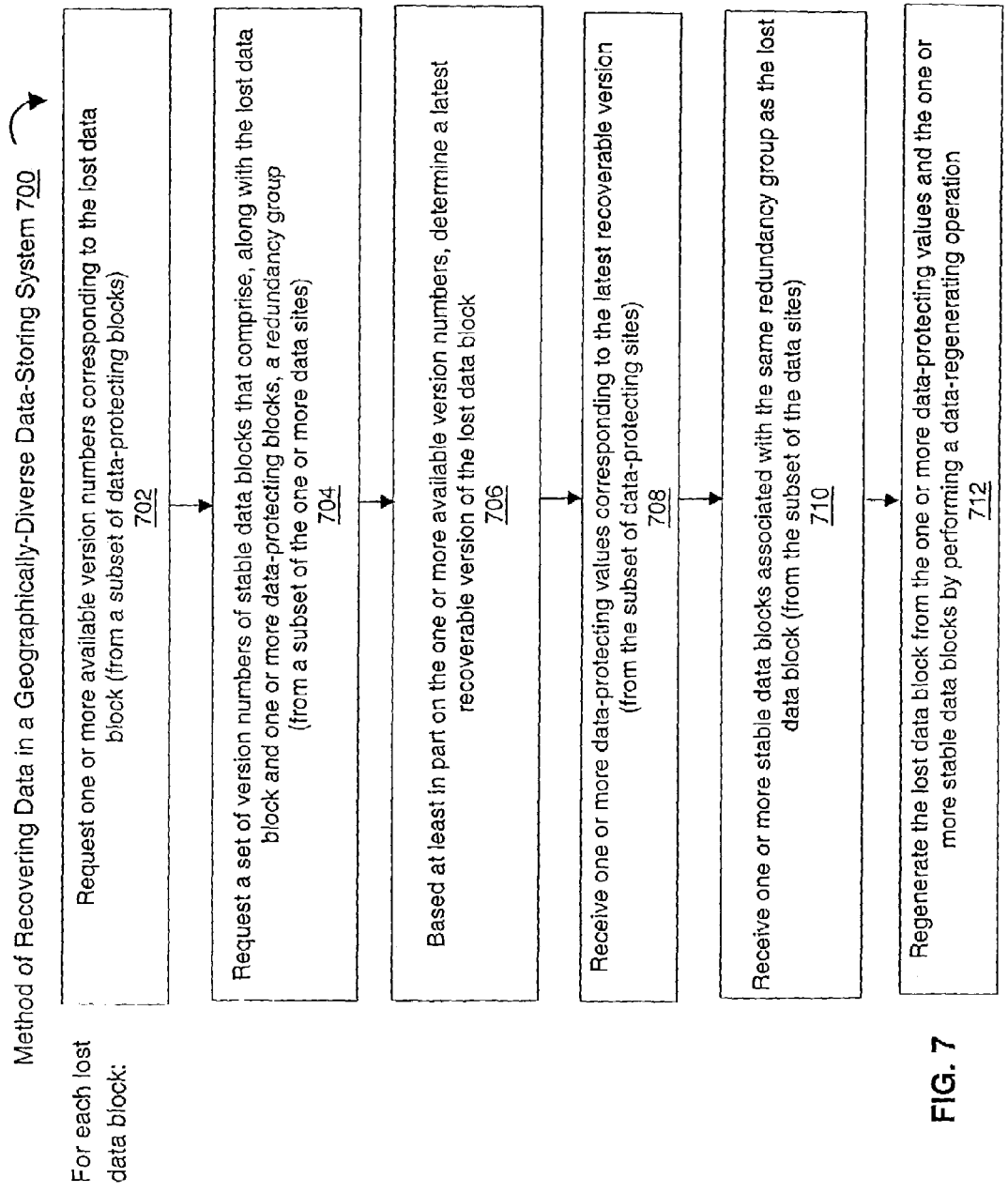
FIG. 7 is a flowchart showing an example of a method for recovering data in a geographically-diverse data-storing system, in accordance with an embodiment of the present invention.

Another example of a method of recovering data in a geographically-diverse data-storing system is shown in FIG. 7. In this method, the recovery coordinator requests, from a subset of data-protecting blocks, one or more available version numbers corresponding to the lost data block (702). Then, the coordinator requests, from a subset of the one or more data-protecting blocks, a set of version numbers of stable data blocks that comprise, along with the lost data block and one or more data-protecting blocks, a redundancy group (704). Using, at least in part, the one or more available version numbers, the coordinator determines a latest recoverable version of the lost data block (706).

After the coordinator has determined the latest recoverable version, it receives, from the subset of data-protecting sites, one or more data-protecting values corresponding to the latest recoverable version (708). It also receives, from the subset of the data sites, one or more stable data blocks associated with the same redundancy group as the lost data block (710). Finally, having assembled all of this information, the coordinator regenerates the lost data block from the one or more data-protecting values and the one or more stable data blocks by performing a data-regenerating operation (712).

Note that, while the above protocol and method have described the recovery of a lost data block, the data-storing system of the present invention is also used to recover lost checksum blocks as well. If a checksum site is lost, but no data sites are lost, a lost checksum site will be recomputed directly from stable and outstanding data blocks in its corresponding group. If some data blocks and some checksum blocks are lost, the data blocks are recomputed first from the surviving data blocks and surviving checksums (to the extent possible), and then the checksums are computed from the reconstructed data.

Serialization of Remote Updates

To ensure the idempotentcy of the data-storing system, consecutive writes to data and data-protecting sites for the same data block must be committed in the same order as the write operations return to their clients. This is accomplished by sending the update and commit requests for the same block in ascending order based on their version numbers. Those, the update and commit requests are cached either locally at a data site, or remotely at a data-storing site, to be executed in succession based on version number.

Also, the serialization during a redo process after a system crash or network outage can be enforced by resending update requests in ascending order of version numbers. This indicates that version numbers of all data blocks on the same logical disk need to be serializable.

One special case of note is the serialization of writes by an application, for example by a "sync" command or the use of a "sync" bit in a block write request. Such a command may require specified blocks to be flushed from cache to disk before the write requests are completed. If a system crashes, the sync requests and associated writes must be completed before subsequent writes can be executed. However, with a geographically-diverse network, it may not be practical to require that remote data-protecting values be committed as well before a sync request is completed. The long latency in WAN communication may be unacceptable to certain applications, and an unreachable data-protecting site may delay a sync request indefinitely.

Therefore, in one embodiment, the semantics for sync requests in the cross-site redundancy contexts are relaxed. A sync request is completed after the requested data has reached local storage, but before its delta reaches the data-protecting sites. In other words, in order to prevent inconsistency upon recovery caused by out-of-order writes, writes following a sync request are propagated to the data-protecting sites only after the data in the sync request has been committed on the data-protecting sites. Thus, the update requests for consecutive writes to the same data block can be collapsed and propagated as one request only if those writes are between two consecutive sync operations.

In summary, a method for storing data in a geographically-diverse data-storing system has been presented that increases reliability, reduces latency, and provides a cost- and performance-effective alternative to mirroring. While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of redundantly storing data in a geographically-diverse data-storing system, the data-storing system having one or more data sites and a plurality of data-protecting sites, the method comprising:
   writing a new version of a set of data to a first data site of the one or more data sites;
   generating a representation of the new version;
   transmitting the representation from the first data site to a subset of the plurality of data-protecting sites;
   at each data-protecting site of the subset of the data-protecting sites:
   storing the representation;
   transmitting an acknowledgment of the storing;
   upon receipt of a commit command, performing a data-protecting operation on the representation to generate a data-protecting value;
   storing the data-protecting value; and
   releasing storage corresponding to the representation; and
   at the first data site, after receipt of acknowledgments from each data-protecting site of the subset of data-protecting sites:
   transmitting a commit command to the subset of the data-protecting sites; and
   releasing storage corresponding to a previous version of the set of data.

2. The method of claim 1, wherein the subset of the data-protecting sites comprises two or more data-protecting sites.

3. The method of claim 1, wherein the generating of the representation is based at least in part on both the new version of the set of data and on the previous version of the set of data.

4. The method of claim 3, wherein the new version of the set of data is written to a first physical address at the first data site, and the previous version of the set of data is written to a second physical address at the first data site.

5. The method of claim 1, wherein the data-protecting operation is conducted at least in part on both the representation and on a previous version of the data-protecting value.

6. The method of claim 1, further comprising:
after receipt of the acknowledgment at the first data site, modifying a logical address corresponding to the set of data in a logical-to-physical map to point to a physical address of the new version of the set of data.

7. A method of redundantly storing data in a geographically-diverse data-storing system, the data-storing system having one or more data sites and a plurality of data-protecting sites, the method comprising:
writing first and second versions of a set of data to a first data site of the one or more data sites, wherein the first data site is local, and other data sites and the plurality of data-protecting sites are remote;
generating a representation of the second version, based at least in part on a change in the set of data between the second version and the first version;
transmitting the representation from the first data site to a subset of the plurality of data-protecting sites;
at each data-protecting site of the subset of the data-protecting sites:
storing the representation;
transmitting an acknowledgment of the storing;
upon receipt of a commit command, performing a data-protecting operation on the representation and on an existing data-protecting value to generate a new data-protecting value;
storing the new data-protecting value; and
releasing storage corresponding to the representation; and
locally, after receipt of acknowledgments from each data-protecting site of the subset of data-protecting sites:
transmitting a commit command to the subset of the data-protecting sites; and
releasing storage corresponding to the first version of the set of data.

8. The method of claim 7, wherein the subset of the data-protecting sites comprises two or more data-protecting sites.

9. The method of claim 7, further comprising;
after receipt of all acknowledgments at the first data site, modifying a logical address corresponding to the set of data in a logical-to-physical map to point to a physical address of the second version of the set of data.

10. The method of claim 9, wherein the logical-to-physical map is stored in nonvolatile memory.

11. The method of claim 7, wherein the second version is entered into a redo log when it is written to the first data site, and is removed from the redo log after the acknowledgment is received at the first data site; and
wherein the redo log identifies versions of sets of data being processed in the event of a system crash such that processing of the identified versions can be completed upon reboot.

12. The method of claim 7, wherein the data-performing operation is determined in accordance with an erasure code.

13. The method of claim 7, wherein the generating the representation of the second version includes XORing the second version and the first version of the set of data.

14. The method of claim 7, wherein the writing of the second version of the set of data to the first data site occurs in response to a write request from a client, and wherein the client write request is fully completed before the generating occurs.

15. The method of claim 7, wherein the one or more data sites comprise one or more hard disks.

16. The method of claim 7, wherein the storing, transmitting, and performing at each data-protecting site are repeated serially for later versions of the set of data, after being performed for the second version of the set of data.

17. The method of claim 7, wherein, at each data-protecting site, the stored second version of the data-protecting value is associated with its corresponding version number in memory.

18. A method of redundantly storing data in a geographically-diverse data-storing system, the data-storing system having one or more data sites and a plurality of data-protecting sites, the method comprising:
mapping physical addresses of the one or more data sites to a plurality of logical addresses in a logical-to-physical map, to logically associate a plurality of data blocks that include geographically-diverse data blocks;
at a local portion of the data-storing system:
writing a new version of a set of data to a first physical address of a first data site of the one or more data sites, wherein a previous version of the set of data was previously written to a second physical address of the first data site;
logging the new version of the set of data in a redo log;
transmitting a representation of the second version to a subset of the plurality of data-protecting sites; and
when the subset of the one or more data-protecting sites acknowledge receipt of the representation:
removing the new version from the redo log;
modifying the logical-to-physical map such that a logical data block corresponding to the set of data identifies the new version;
releasing storage corresponding to the new version; and
transmitting a command to the subset of the data-protecting sites to generate and store a data-protecting value based at least in part on the representation.

19. The method of claim 18, wherein the subset of the data-protecting sites comprises two or more data-protecting sites.

20. The method of claim 18, further comprising, at each data-protecting site of the subset of the data-protecting sites:
storing the representation;
logging the representation in a second redo log;
transmitting an acknowledgment of the storing;
upon receipt of the command to generate and store a data-protecting value,
performing a data-protecting operation on the representation to generate a data-protecting value;
storing the data-protecting value;
releasing storage corresponding to the representation; and
removing the representation from the second redo log.

21. A method of recovering data in a geographically-diverse data-storing system, the data-storing system having one or more data sites and a plurality of data-protecting sites, wherein a set of data blocks is lost from a first data site of the one or more data sites, the method comprising:

for each lost data block of the set of lost data blocks:
> requesting, from a subset of the plurality of data-protecting sites, one or more available version numbers corresponding to the lost data block;
> requesting, from a subset of the one or more data sites, a set of version numbers of stable data blocks that comprise, along with the lost data block and one or more data-protecting blocks, a redundancy group;
> based at least in part on the one or more available version numbers, determining a latest recoverable version of the lost data block;
> receiving, from the subset of the data-protecting sites, one or more data-protecting values corresponding to the latest recoverable version;
> receiving, from the subset of the data sites, one or more stable data blocks, associated with the same redundancy group as the lost data block; and
> regenerating the lost data block from the one or more data-protecting values and the one or more stable data blocks by performing a data-regenerating operation.

22. The method of claim 21, wherein the first data site is geographically diverse from other data sites of the one or more data sites, and from the plurality of data-protecting sites.

23. The method of claim 21, wherein recovering all lost data is possible if a total number of the plurality of data-protecting sites is greater than a total number of sites lost, including both lost data sites and lost data-protecting sites.

24. The method of claim 21, further comprising:
instructing the subset of the data-protecting sites to synchronize their data-protecting values corresponding to the regenerated lost data block.

25. The method of claim 21, wherein at each data-protecting site of the subset of data-protecting site:
upon receiving a request for a data-protecting value corresponding to the latest recoverable version, stopping operations to store or release additional data-protecting values.

\* \* \* \* \*

UNITED STATES PATENT AND TRADEMARK OFFICE
CERTIFICATE OF CORRECTION

PATENT NO. : 6,970,987 B1  Page 1 of 1
APPLICATION NO. : 10/352842
DATED : November 29, 2005
INVENTOR(S) : Minwen Ji et al.

It is certified that error appears in the above-identified patent and that said Letters Patent is hereby corrected as shown below:

In column 17, line 51, in Claim 9, after "comprising" delete ";" and insert -- : --, therefor.

In column 20, line 14, in Claim 25, after "wherein" insert -- , --.

Signed and Sealed this

Twenty-fifth Day of August, 2009

David J. Kappos
*Director of the United States Patent and Trademark Office*